(12) United States Patent
Kawano et al.

(10) Patent No.: US 7,203,804 B2
(45) Date of Patent: Apr. 10, 2007

(54) PROCESS, APPARATUS, AND SYSTEM FOR PASSING DATA BETWEEN PARTITIONS IN A STORAGE DEVICE

(75) Inventors: Seiichi Kawano, Sagamihara (JP); Ken Sasaki, Yamato (JP); Mikio Hagiwara, Yamato (JP); Kishiko Itoh, Machida (JP)

(73) Assignee: International Business Machines Corporation, Armonk, NY (US)

( * ) Notice: Subject to any disclaimer, the term of this patent is extended or adjusted under 35 U.S.C. 154(b) by 415 days.

(21) Appl. No.: 10/455,603

(22) Filed: Jun. 4, 2003

(65) Prior Publication Data
US 2003/0229768 A1 Dec. 11, 2003

(30) Foreign Application Priority Data
Jun. 7, 2002 (JP) .............................. 2002-166706

(51) Int. Cl.
*G06F 12/00* (2006.01)
(52) U.S. Cl. ...................................... 711/162; 711/156
(58) Field of Classification Search ................ 711/162, 711/156
See application file for complete search history.

(56) References Cited

U.S. PATENT DOCUMENTS

| | | | |
|---|---|---|---|
| 6,175,904 B1 * | 1/2001 | Gunderson ................... | 711/162 |
| 6,430,663 B1 * | 8/2002 | Ding .......................... | 711/162 |
| 6,523,103 B2 * | 2/2003 | Page .......................... | 711/173 |
| 6,721,885 B1 * | 4/2004 | Freeman et al. ............... | 713/2 |
| 6,901,493 B1 * | 5/2005 | Maffezzoni .................. | 711/162 |
| 2002/0161832 A1 * | 10/2002 | Brebner ....................... | 709/203 |
| 2003/0014619 A1 * | 1/2003 | Cheston et al. ................ | 713/1 |
| 2003/0188115 A1 * | 10/2003 | Maezawa ..................... | 711/162 |

FOREIGN PATENT DOCUMENTS

| | | |
|---|---|---|
| JP | 09-237128 | 9/1997 |
| JP | 11-282685 | 10/1999 |
| JP | 2000-215065 | 8/2000 |
| JP | 2001-256066 | 9/2001 |

OTHER PUBLICATIONS

Microsoft® Computer Dictionary, Fifth Edition, Microsoft Press, 2002, pp. 60.*
Nikkei BP PC Best, Mook p. 68-83, "PC Management Techniques-file Management.".

* cited by examiner

*Primary Examiner*—Matthew Kim
*Assistant Examiner*—Shane M. Thomas
(74) *Attorney, Agent, or Firm*—Kunzler & Associates

(57) ABSTRACT

A process, apparatus, and system are disclosed that allow information to be passed between software modules in different partitions in an environment for a predetermined operating system (OS) and an area hidden from the operating system (OS) in a storage device, such as hard disk drive (HDD). The computer system may include a hard disk drive (HDD) that meets a protected area run time interface extension services (PARTIES) specification and that has an access environment for an operating system (OS) and a PARTIES partition. The PARTIES partition is an area hidden from the operating system (OS). The computers system also includes a CMOS/NVRAM that provides a work area for communication between a user mode module, operating in the access environment for the operating system (OS) in a user data management application, and a management mode module, operating in an environment corresponding to the hidden area.

16 Claims, 4 Drawing Sheets

PROCESS, APPARATUS, AND SYSTEM FOR PASSING DATA BETWEEN PARTITIONS IN A STORAGE DEVICE

BACKGROUND OF THE INVENTION

1. Field of the Invention

The present invention relates to a computer system having a storage device such as a hard disk drive (HDD), and more particularly to a computer system capable of passing data between an environment for a predetermined operating system (OS) and an area hidden from the OS.

2. Description of the Related Art

It has been possible to form an area within a hard disk drive (HDD) that is hidden from an operating system (OS) by using the hard disk drive (HDD) function of supporting AT attachment/advanced technology attachment packet interface-5 (ATA/ATAPI-5) specifications as industry standards and protected area run time interface extension services (PARTIES) architecture that is an American National Standards Institute (ANSI) standard. The protected area run time interface extension services (PARTIES) uses a "SET MAX ADDRESS" command to realize the specifications.

FIG. 4 is a view for explaining a function of PARTIES in a hard disk drive (HDD) 400, representing an image in which an area of the hard disk drive (HDD) 400 is cut in a slice. Herein, the value of a "Max" 402 for the artificial maximum area is defined, a normal command is given an area up to the "Max" 402, and an operating system (OS) has a use area ranging from a "Start" 404 to the "Max" 402. A PARTIES partition 406 ranges from the "Max" 402 to a "Native Max" 408 that is the intrinsic maximum area in the hard disk drive (HDD) 400. In a "Boot Engineering Extension Record" 410 having the specification decided or defined in the PARTIES partition 406, the information included in the PARTIES partition 406 is stored, and by referring to this record 410, various functions for the PARTIES partition 406 can be employed.

A way of uses as supposed in the specification of the PARTIES includes allocating the A: drive when the operating system (OS) is booted from the PARTIES partition, though the A: drive is normally allocated when the operating system (OS) is booted from a removable memory such as a floppy disk. For example, there is a service for access to the PARTIES partition, employing a basic input/output system (BIOS) call, or an Interrupt 13 of the BIOS, to a removable medium. That is, when the OS is booted from the PARTIES partition, the A: drive is seen, and the normal area looks like the C: drive. Thereby, a preload image of the operating system (OS)0 is stored in an area of the PARTIES to allow the recovery from this area or the BIOS set-up, in which information necessary for setting up the hardware and password and describing a boot sequence is stored, instead of the read only memory (ROM), whereby the user can make a set-up operation employing a graphical user interface.

However, the hidden area provided as a hardware function, such as the PARTIES partition, is presupposed to be only used in a limited way as above, but not applied for other functions.

Meanwhile, an environment used by a user typically containing various drivers and applications, an information area in an operating system (OS) called a registry might be broken or modified resulting in improper operation of the operating system (OS). In most of such cases, only the operating system (OS) and the applications need to be re-installed. In the process, user data should be saved and only the user data need to be recovered after re-installing the operating system (OS) and applications. Typically, other removable disks or storage on a network would be used for storing the data, however, the use of those other storage devices has been disadvantageous in that they require a lot of effort for recovery.

What is needed is a process, apparatus, and system that solve the above-mentioned technical problem. Beneficially, such a process, apparatus, and system would allow information to be passed between software modules in different partitions within a storage device such as a hard disk drive (HDD). The process, apparatus, and system would also allow information to be passed between a PARTIES partition in a hard disk drive (HDD), for example, and a normal partition to realize data backup using the PARTIES partition.

BRIEF SUMMARY OF THE INVENTION

The present invention has been developed in response to the present state of the art, and in particular, in response to the problems and needs in the art that have not yet been fully solved by currently available computer systems and storage devices. Accordingly, the present invention has been developed to provide a process, apparatus, and system for passing data between partitions in a storage device that overcome many or all of the above-discussed shortcomings in the art.

The apparatus for passing data between partitions in a storage device is provided with a logic unit containing a plurality of modules configured to functionally execute the necessary steps of passing data between partitions in a storage device. These modules in the described embodiments include a user mode module and a management mode module within a user data management application.

The computer system to which the invention is applied comprises a storage device that meets PARTIES specification or an equivalent standard and that has an access environment for an operating system (OS) and a PARTIES partition that is an area hidden from the operating system (OS). The computer system also comprises a memory that provides a work area for communication between a user mode module operating in the access environment for the operating system (OS) and a management mode module operating in an environment corresponding to the hidden area.

Herein, information for passing data between an access environment of an operating system (OS) and an area hidden from the operating system (OS) is saved in a nonvolatile memory, such as a nonvolatile random access memory (NVRAM). For example, in one embodiment, a file status concerning the user data stored in an area in the access environment of the operating system (OS) and required to back up is saved. Also, information (e.g., the flag indicating a result of creating the file for recovery) regarding a recovery request for the user mode module for the user data stored in the area hidden from the operating system (OS) may be saved.

Also, this invention provides a computer system having a storage device that can form a first partition that is an operating environment for a predetermined operating system (OS) and a second partition that is an area hidden from the predetermined operating system (OS), comprising a first software module operating on the predetermined operating system (OS) that is installed in the first partition in the storage device, and a second software module operating on an operating system (OS) that is installed in the second partition. In one embodiment, the first software module stores information on user data to be backed up in memory and the second software module stores the user data to be backed up in the second partition based on the information stored in the memory.

Herein, the first software module may be configured to secure an area for recovering the user data in the first partition and makes a recovery request to the second software module, in which the second software module may be configured to store the user data stored in the second partition in the area of the first partition in response to the recovery request. Furthermore, the computer system may further comprise a BIOS for supporting to boot the operating system (OS) installed in the second partition and creating a system management BIOS (SMBIOS) Data Area.

In a further embodiment, this invention provides a user data storage device comprising storage means having a first partition that is an operating environment for a predetermined operating system (OS) and a second partition that is an area hidden from the predetermined operating system (OS). Another embodiment of the invention includes a saving/management means for saving and administering the user data, the saving/management means having a first module operating in the first partition and a second module operating in the second partition A still further embodiment of the invention may include a communication providing means for providing communications between the first module and the second module in the saving/management means in passing the user data between the first partition and the second partition.

Further, this invention provides a storage data passing method for passing data between a first partition that is an operating environment for a predetermined operating system (OS) and a second partition that is an area hidden from the predetermined operating system (OS). In one embodiment, the storage data passing method comprises a step of saving in a memory a status of data passed from the first partition to the second partition by a first software module operating in an environment of the first partition, a step of saving the data in the second partition by a second software module operating in an environment of the second partition, based on the status saved in the memory, a step of securing an area for recovering the data in the first partition by the first software module, a step of making a recovery request to the second software module by the first software module, and a step of saving the data stored in the second partition in the area of the first partition, based on the recovery request.

From another aspect, this invention provides a user data backup method for backing up the user data in a storage device. In one embodiment, the user data backup method comprises storing a status of a backup file for the user data in a memory, booting an operating system (OS) for a system partition different from a saving area of the user data in the storage device, recognizing the status stored in the memory by a software module operating on the booted operating system (OS), retrieving a file based on the recognized status, and saving the retrieved file in the system partition (second partition that is the area hidden from the predetermined operating system (OS)). Herein, the user data backup method may further comprise retrieving the file employing a hibernation technique, or more particularly, checking a flag in the memory at a shutdown caused by a hibernation function, and retrieving the file based on information of SMBIOS Data when the flag is set.

This invention also may be embodied as a program for causing a computer having a storage device that can form a first partition that is an operating environment for a predetermined operating system (OS) and a second partition that is an area hidden from the predetermined operating system (OS) to execute the functions. This program, in one embodiment, comprises a function of storing a status of data passed from the first partition to the second partition in a memory by operating in an environment of the first partition, a function of saving the data in the second partition, based on the status saved in the memory, by operating in an environment of the second partition, a function of securing an area for recovering the data in the first partition by operating in the environment of the first partition, a function of saving a recovery request for the data in the memory by operating in the environment of the first partition, and a function of saving the data stored in the second partition in the area of the first partition in response to the recovery request saved in the memory by operating in the environment of the second partition.

This invention may also provide a program for causing a computer having a storage device to execute a function of storing status of a backup file user data for an operating system (OS) environment in memory within the operating system (OS) environment in the storage device, a function of booting a special operating system (OS) (operating system (OS) created for special purpose and booted from the second partition) that is installed in an area within the storage device that is hidden from the operating system (OS), a function of recognizing the status stored in the memory by a software module operating on the booted special operating system (OS), and a function of saving the backup file in the area hidden from the operating system (OS) based on the recognized status.

The programs are preferably installed in a computer at the time the computer is provided to the customer. Alternatively, the programs executed by the computer may be stored in a computer readable recording medium. The recording medium may be a floppy disk or CD-ROM medium, in which the programs are read by a floppy disk drive or a CD-ROM reader, stored in a flash ROM and the like and executed. Also, these programs may be distributed via a network by a program transmission apparatus. The program transmission apparatus comprises a memory provided in a server on a host side for storing the programs and program transmission means for transmitting the programs via the network.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1:
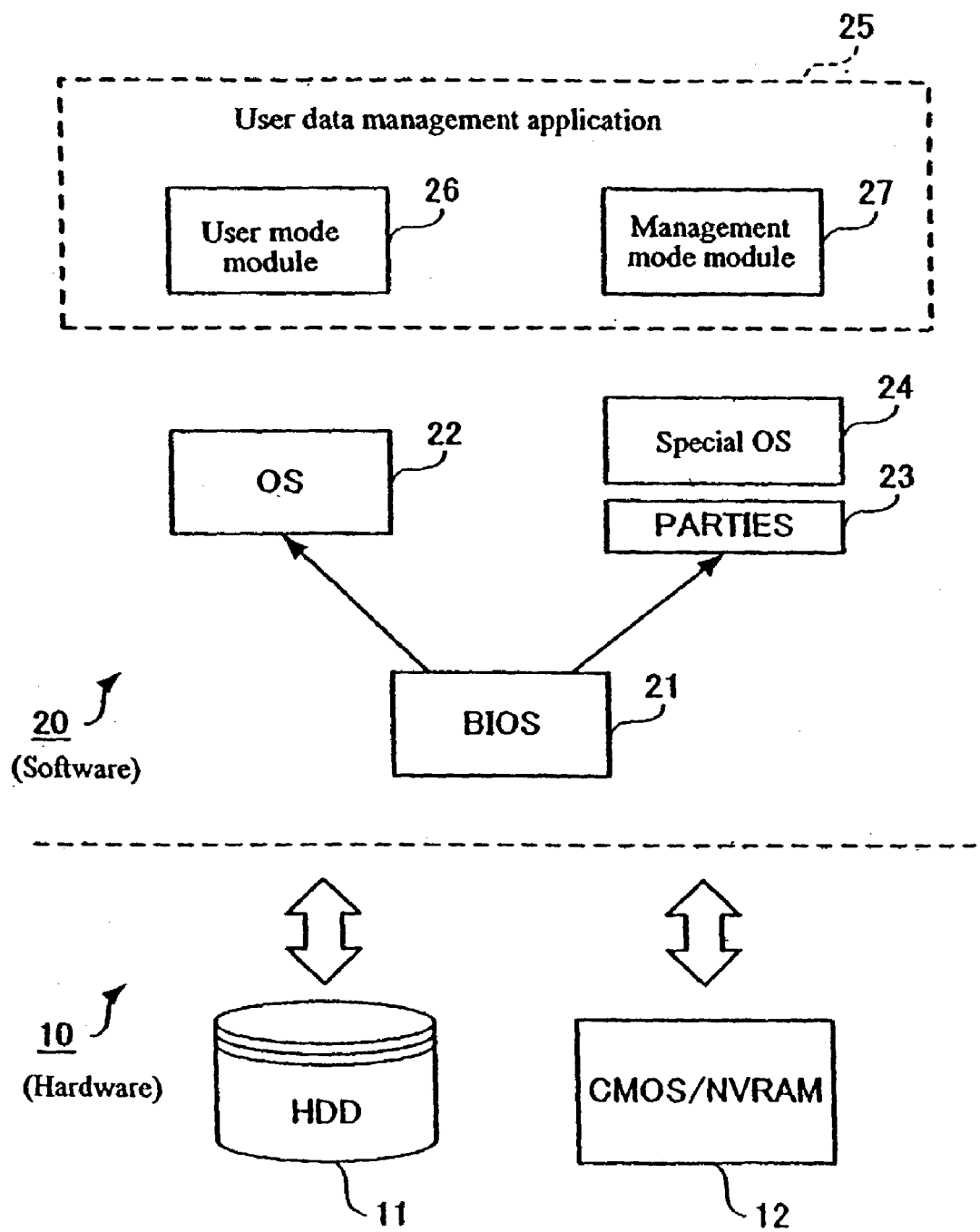
FIG. 1 is a schematic block diagram illustrating one embodiment of a computer system in accordance with the present invention.

FIG. 1 is a diagram showing the overall configuration of a computer system according to an embodiment of the present invention. The computer system as shown in FIG. 1 is largely divided into hardware 10 and software 20. Herein, the "system" is defined as a system in which a plurality of devices (functions) are logically assembled, irrespective of whether the devices (functions) may be contained within the same housing or not. Accordingly, these components may be integrated into one apparatus as a trading object, or a specific element may be handled singly in another housing.

The depicted hardware 10 comprises a hard disk drive (HDD) 11 that, in one embodiment, is a nonvolatile storage device for holding an operating system OS user data, and a CMOS/NVRAM 12 as a work area for a user data management application (described later) operating in different partitions or operating systems (OSs), namely, as one of the communication providing means. The hard disk drive (HDD) 11 supports ATA/ATAPI-5 specifications and meets the PARTIES specifications. This hard disk drive (HDD) 11 comprises an area (normal partition) operating by the operating system (OS) and a PARTIES partition operating as a system partition by another DOS compatible operating system (OS), allowing the information to be passed between these partitions.

The depicted software 20 has a BIOS 21 for controlling a variety of devices connected to the computer system, an operating system (OS) 22 that provides a system management in the computer system and a basic user operation environment, a PARTIES 23 that is a standard architecture for ANSI, a special operating system (OS) 24 that, in one embodiment, is a DOS compatible operating system (OS) booted from the PARTIES partition, and a user data management application 25 as a saving and administering means that may be configured for saving and administering the user data. The depicted user data management application 25 has a user mode module 26 that may operate in an operating system (OS) 22/user environment, and a management mode module 27 that may operate in an environment of the PARTIES 23. The user mode module 26 and the management mode module 27 are configured in one embodiment to communicate with the CMOS/NVRAM 12 as a work area.

The BIOS 21 generally supports the specifications of the PARTIES 23 and the booting of the special operating system (OS) 24 from the PARTIES partition. Also, it has a function of creating an SMBIOS Data Area and displaying a file name or a public key. Moreover, it has a function of administering the public key. The SMBIOS stores various kinds of information concerning the system, such as memory size, disk information, video card information for console, and APM BIOS check.

The PARTIES partition that is created as an area hidden from the operating system (OS) 22 in the hard disk drive (HDD) 11 by the PARTIES 23 is usually not permitted for access once the operating system (OS) 22 is booted. That is, the PARTIES partition is a security partition in which no data is broken in the operating system (OS) environment, and no data access is made, so that it is possible to prevent the entry of a virus. However, under the conventional technique, this partition is not permitted to be utilized as a secondary storage area after the operating system (OS) 22 is booted. In this embodiment, the information such as file name is handled as SMBIOS data under the support of the BIOS 21, and data of another file is accessed from another partition, employing an existent hibernation technique (for automatically saving the operation content immediately before the hibernation in the hard disk drive (HDD) 11 at the same time of turning off the power of the computer system) for file access. That is, employing a hibernation function that the BIOS 21 finds out the file area, data is backed up into the file using the operating system (OS) API in the PARTIES partition.

For example, there may be a case, when the user sets a certain device drive that the operating system (OS) 22 itself may be unstable and cleaned up again for restart. In such case, it is required that the stored data is saved in another place. Even if the operating system (OS) 22 is broken to disable access to the data before one is aware of it, one may want to access the data. To cope with this trouble, in this embodiment, the data may be saved as a preload image in the PARTIES partition, after the operating system (OS) is booted. This preload image then may be restored in the original area when needed. Herein, as the conventional specifications of the PARTIES 23, a method for recovering the operating system (OS) 22 from the prepared information (species) that is a source for the preload is offered, after the operating system (OS) is booted from the A: drive. With this method in the present embodiment, for example, when the operating system (OS) 22 is unstable, the operating system (OS) 22 maybe recovered, using the prepared information, after the special operating system (OS) 24 for the PARTIES 23 is booted. In this manner, the document data produced so far may be copied from the PARTIES partition, making it possible to reproduce the document data without causing problems.

Therefore, one's own data residing in the operating system (OS) 22 and a save area in the PARTIES partition are prepared. When saved, the data is passed from the environment of the operating system (OS) 22 to the PARTIES partition, or when it is necessary to recover data, the data is passed from the PARTIES partition to the environment of the operating system (OS) 22. To implement such a function, two software modules may be employed, including a user mode module 26 operating in the environment of the operating system (OS) 22 and a management mode module 27 operating in the PARTIES partition. Between these two modules 26, 27, the information is exchanged, in one embodiment, via the CMOS/NVRAM 12 to implement the above function.

The user mode module 26 serves in one embodiment to back up the user data. The user mode module 26 may be further configured to retrieve the user data to recover its own data after reinitializing the hard disk drive (HDD) 11. In backing up the user data, an area for saving the user data is secured, employing a file system of the operating system (OS) 22. Also, the user data is compressed, and saved in a single file, or its status is saved in the CMOS/NVRAM 12. In retrieving the user data, an area for recovering the user data is secured, employing the file system (file management system) of the operating system (OS) 22. Also, the user mode module 26 makes a recovery request to the management mode module 27 via the CMOS/NVRAM 12. Moreover, after the end of recovery, the file name may be changed to one employed by the user, and the user data is disclosed.

The management mode module 27 likewise serves to back up the user data. The management mode module 27 may be further configured to retrieve the user data. Employing a hibernation technique, the file in the user area may be accessed from the PARTIES partition. In backing up the user data, the file produced by the user mode module 26 is copied to the PARTIES partition in accordance with a status of the CMOS/NVRAM 12. Also, in retrieving the user data, the user data saved in the PARTIES partition is copied to the user operating system (OS) area in accordance with a status of the CMOS/NVRAM 12.

Figure 2:
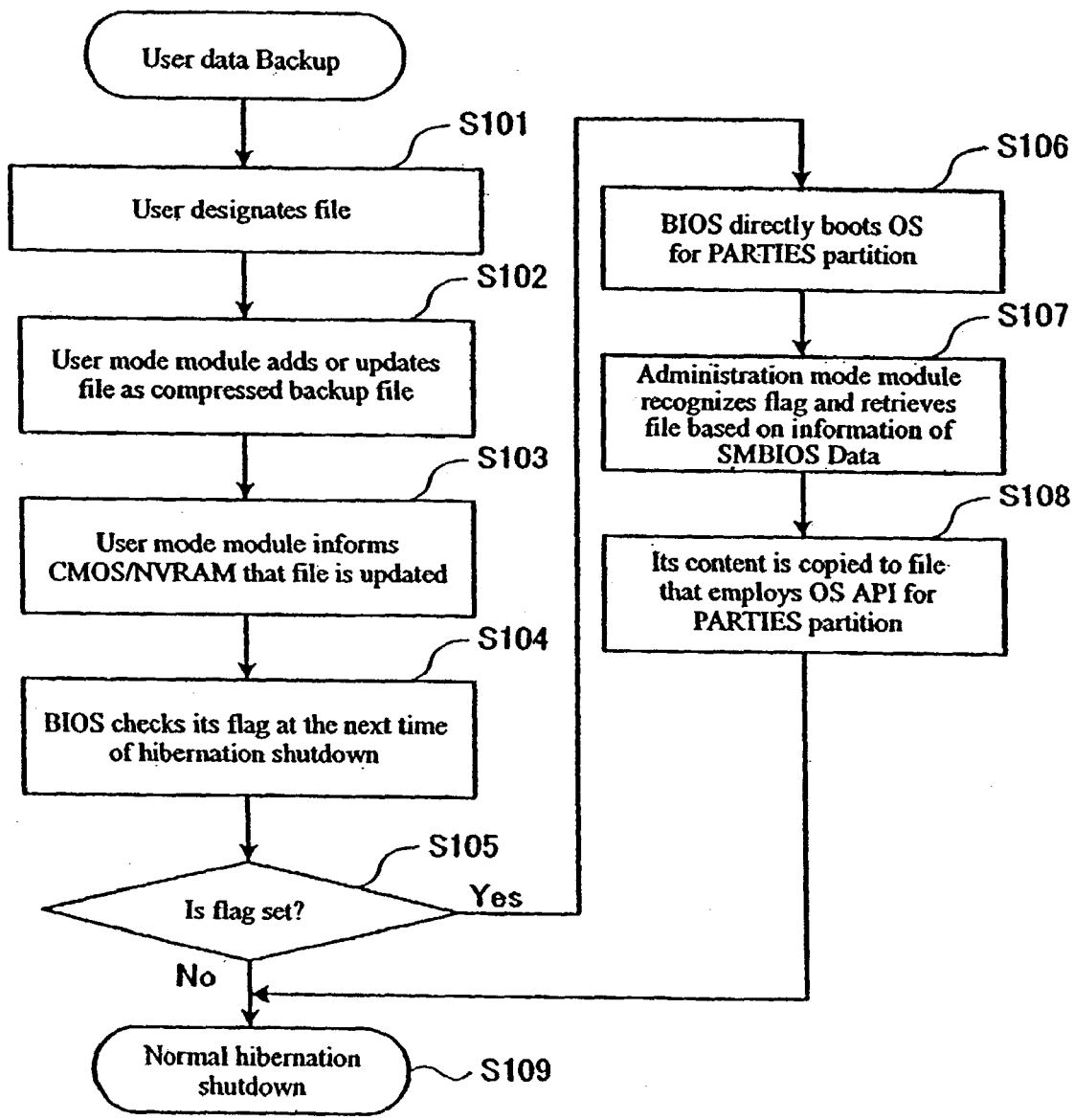
FIG. 2 is a schematic flow chart diagram illustrating one embodiment of a backup flow for the user data in accordance with the present invention.

FIG. 2 is a flowchart showing one embodiment of a backup flow for the user data. In a depicted data backup process as shown in FIG. 2, the user performs the back up of the data, in one embodiment, by employing the user mode module 26. First of all, the user designates a file (step 101). The user mode module 26 adds or updates the designated file as a compressed backup file (step 102). Then, the user mode module 26 informs the CMOS/NVRAM 12 that the file is updated (step 103). The CMOS/NVRAM 12 has a storage space as small as 8 Kbytes, and can not save the data itself, but can save the file name.

Thereafter, at the next time of hibernation shutdown, the BIOS 21 checks its flag (step 104). If the flag is not set, a normal hibernation shutdown process is performed (step 109). If the flag is set, the BIOS 21 directly boots the special operating system (OS) 24 that is the operating system (OS) for the PARTIES partition (step 106). And the management mode module 27 recognizes the flag, and retrieves the file, based on the information of SMBIOS Data that is the data of BIOS 21 (step 107). Then, the retrieved file content is copied to the file that employs the operating system (OS) API for the PARTIES partition (step 108), and the normal hibernation shutdown process is performed (step 109).

Figure 3:
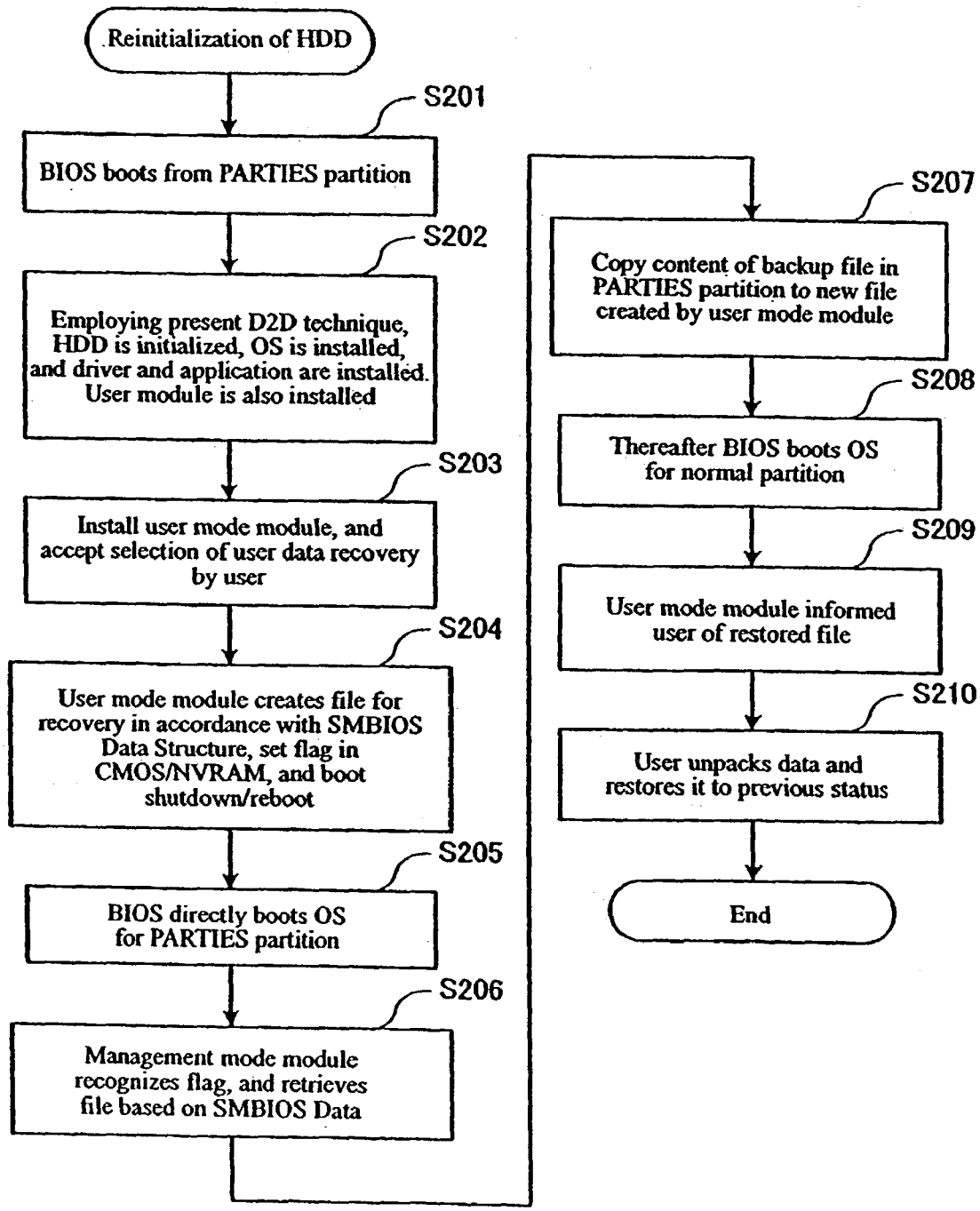
FIG. 3 is a schematic flow chart diagram illustrating one embodiment of a procedure for recovering the user data in accordance with the present invention.
Figure 4:
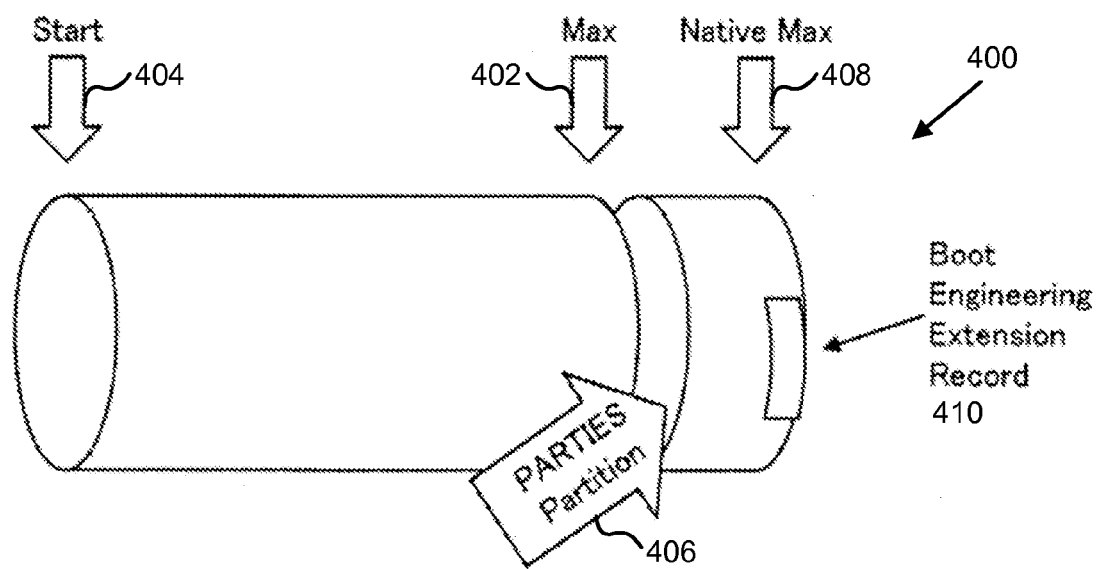
FIG. 4 is a schematic block diagram illustrating one embodiment of a conventional hard disk drive (HDD) using PARTIES.

FIG. 3 is a flowchart showing one embodiment of a procedure for recovering the user data. Herein, a process flow is shown for reinitializing the hard disk drive (HDD) 11 by the user when data of the hard disk drive (HDD) 11 is broken. In reinitializing the hard disk drive (HDD) 11, first of all, the BIOS 21 boots the special operating system (OS) 24 that is the operating system (OS) for the PARTIES partition (step 201). Then, the hard disk drive (HDD) 11 is initialized, in one embodiment, by employing a present disk to disk (D2D) technique. The operating system (OS) 22 is then installed and the driver and the application are installed. Also, the user module is installed (step 202). Then, the user mode module 26 is subsequently installed and the user data recovery by the user is selected (step 203).

In the depicted embodiment, the user mode module 26 then creates a file for recovery in accordance with the SMBIOS Data Structure, sets a flag in the CMOS/NVRAM 12, and performs the shutdown/reboot (step 204). Also, the BIOS 21 directly boots the special OS 24 that is the operating system (OS) for the PARTIES partition (step 205). The management mode module 27 then recognizes the flag and retrieves the file, based on the information of SMBIOS Data (step 206). Also, the management mode module 27 copies the content of a backup file in the PARTIES partition to a new file created by the user mode module 26 (step 207). Then, the BIOS 21 boots the operating system (OS) 22 in the normal partition (step 208), and the user mode module 26 displays the file restored by the user (step 209). Then, the user unpacks the data and restores it to a previous status (step 210), whereby the reinitialization of the hard disk drive (HDD) 11 is ended.

In this manner, according to the described embodiment of the invention, for example, data may be passed between the environment of the operating system (OS) 22 not supported by the specification of the ANSI PARTIES and the area (PARTIES partition) hidden from the operating system (OS) 22 to implement a user data backup function. At this time, in this embodiment, two software modules, the user mode module 26 and the management mode module 27 of the user data management application 25, may operate under the operating system (OS) 22 installed and the special operating system (OS) 24 in separate partitions. Also, the backup of the user data, for example a file in the ZIP compression format, may be managed employing the API of the operating system (OS) 22. Normally, data of other file can not be accessed from other partitions, but in this embodiment, the information, such as the file name, maybe handled as the data of SMBIOS under the support of the BIOS 21, and a part of the existent hibernation technique for file access (file search) may be applied, whereby the data may be accessed between different partitions.

As described above, with the present invention, information can be passed between different partitions in an environment of a predetermined operating system (OS) 22 and an area hidden from the operating system (OS) 22 in a storage device, such as the hard disk drive (HDD) 11.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. An apparatus for passing data between partitions in a storage device, the apparatus comprising:

a first operating system installed on a first partition of the storage device;

a second operating system installed on a second partition of the storage device, the second partition hidden from the first operating system, wherein the second partition is inaccessible to the first operating system for data storage;

a user mode module configured to operate on the first operating system and to store in a memory information that is associated with user data to be backed up and to allocate a recovery area of the first partition of the storage device for the user data stored in the second partition of the storage device, wherein the memory comprises memory accessible to both the first and second operating systems; and a management mode module configured to operate on the second operating system, to retrieve the information associated with user data from the memory and to store the user data in the second partition of the storage device.

2. The apparatus of claim 1, wherein the storage device is configured to meet one of a protected area run time interface extension services (PARTIES) specification and an equivalent PARTIES specification and the second partition is a PARTIES partition.

3. The apparatus of claim 1, wherein instructions to be executed by the user mode module and the management mode module comprise passing instructions that indicate a procedure for passing data between the first and second partitions of the storage device.

4. The apparatus of claim 1, wherein the information to be stored in the memory comprises status data associated with the user data that is to be backed up to the second partition of the storage device.

5. The apparatus of claim 1, wherein the storage device is a hard disk drive.

6. The apparatus of claim 1, further comprising a bios module configured to boot the second operating system installed on the second partition upon shutdown of the first operating system when the user mode module indicates there is information associated with user data in the memory to be backed up and to direct the management module to backup the user data to the second partition.

7. The apparatus of claim 1, wherein the memory comprises non-volatile memory accessible to the first operating system while the first operating system is running and to the second operating system while the second operating system is running.

8. The apparatus of claim 1, wherein the user data is a compressed file and the information that is associated with user data comprises one of status information regarding the user data, a file name information regarding the user data, and a flag which indicates creation of a file for recovery.

9. A process for passing data between partitions in a storage device, the process comprising:

operating a first operating system installed on a first partition of the storage device;

operating a second operating system on a second partition of the storage device, the second partition hidden from the first operating system, wherein the second partition is inaccessible to the first operating system for data storage;

storing in a memory information associated with user data to be backed up, wherein the memory comprises memory accessible to both the first and second operating systems;

retrieving the information associated with user data from the memory;

storing the user data in the second partition of the storage device; and restoring the user data in an allocated recovery area of the first partition in response to a recovery request.

10. The process of claim 9, further comprising restoring the user data to the first partition in response to a recovery request after the first operating system is restored.

11. The process of claim 9, wherein the storage device is configured to meet one of a protected area run time interface extension services (PARTIES) specification and an equivalent PARTIES specification and the second partition is a PARTIES partition.

12. The process of claim 9, further comprising executing passing instructions that indicate a procedure for passing data between the first and second partitions of the storage device.

13. The process of claim 9, further comprising storing in the memory status data associated with the user data to be backed up to the second partition of the storage device.

14. The process of claim 9, further comprising storing in the memory recovery data associated with a recovery request from a user mode module for the user data stored in the second partition of the storage device.

15. The process of claim 9, wherein storing in a memory information associated with user data to be backed up further comprises shutting down the first operating system, and storing the user data in the second partition of the storage device further comprises starting up the second operating system in response to a request to store user data prior to storing the user data in the second partition.

16. A process for passing data between partitions in a storage device, the process comprising:

operating a first operating system installed on a first partition of the storage device;

storing in a memory information associated with user data to be backed up, wherein the memory comprises memory accessible to both the first operating system and a second operating system, and shutting down the first operating system;

starting the second operating system on a second partition of the storage device, the second partition hidden from the first operating system, wherein the second partition is inaccessible to the first operating system;

retrieving the information associated with user data from the memory;

storing the user data in the second partition of the storage device and shutting down the second operating system;

allocating a recovery area of the first partition of the storage device for the user data stored in the second partition of the storage device; and saving the user data in the recovery area of the first partition in response to a recovery request.

* * * * *